United States Patent
Ritter et al.

(10) Patent No.: US 8,898,386 B2
(45) Date of Patent: Nov. 25, 2014

(54) LOGICAL VOLUME GROUP DRIVE CONTROL

(75) Inventors: Raymond A Ritter, Spring, TX (US);
Balaji Natrajan, Spring, TX (US);
Michael G Myrah, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 13/562,419

(22) Filed: Jul. 31, 2012

(65) Prior Publication Data
US 2014/0040544 A1    Feb. 6, 2014

(51) Int. Cl.
*G06F 12/02* (2006.01)
*G06F 3/06* (2006.01)
*G06F 1/32* (2006.01)

(52) U.S. Cl.
CPC ............ *G06F 3/0689* (2013.01); *G06F 1/3287* (2013.01)
USPC .......................................... 711/114; 713/324

(58) Field of Classification Search
CPC ... G06F 1/3203; G06F 1/3206; G06F 1/3221; G06F 1/3225; G06F 1/3268; G06F 1/3287; G06F 1/3293; G06F 11/3062; G06F 3/0689
See application file for complete search history.

(56) References Cited

U.S. PATENT DOCUMENTS

| | | | |
|---|---|---|---|
| 5,388,265 A | 2/1995 | Volk | |
| 5,944,831 A * | 8/1999 | Pate et al. | 713/324 |
| 7,254,732 B2 | 8/2007 | Bashford et al. | |
| 7,296,094 B2 | 11/2007 | Bashford et al. | |
| 7,743,269 B2 | 6/2010 | Marks et al. | |
| 8,127,164 B2 * | 2/2012 | Diab et al. | 713/324 |
| 8,135,905 B2 * | 3/2012 | Mori | 711/114 |
| 2009/0235104 A1 * | 9/2009 | Fung | 713/324 |

OTHER PUBLICATIONS

Author Unknown, "Adaptec Storage Manager, User's Guide, For Direct Attached Storage", Copyright 2008 pp. 1-182.

* cited by examiner

*Primary Examiner* — Hiep Nguyen

(57) ABSTRACT

A volume group power control system and a corresponding method are disclosed. The system is to organize a plurality of drive systems into a plurality of logical volume groups and to store group data identifying each of the plurality of logical volume groups. Each of the logical volume groups includes a plurality of the drive systems. The array controller includes a power management component to monitor activity of each of the plurality of drive systems in each of the plurality of logical volume groups and to deactivate the plurality of drive systems associated with a given one of the plurality of logical volume groups in response to the power management component determining that the plurality of drive systems associated with the given one of the plurality of logical volume groups is substantially inactive.

17 Claims, 2 Drawing Sheets

LOGICAL VOLUME GROUP DRIVE CONTROL

BACKGROUND

Large computer systems, such as in an enterprise or service provider data center, can often require large amounts of data storage capability. Such data centers can include redundant arrays of independent disks (RAID) sets that can include a number of memory storage drives to accommodate the necessary data storage capability. The data centers can be organized as a virtual drive memory system that includes a number of logical volume groups, such that each logical volume group can include a set of memory storage drives. The logical volume groups can thus correspond to a distributed memory system across the number of memory storage drives, with a central controller directing the storage and access of data from the different memory storage drives across the logical volume groups.

DETAILED DESCRIPTION

Figure 1:
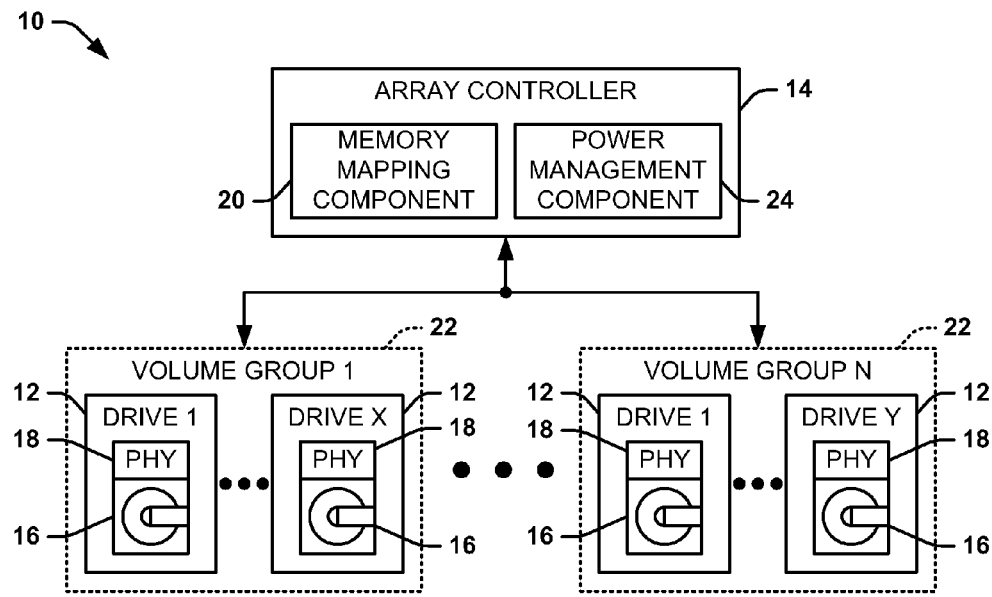
FIG. 1 illustrates an example of a virtual drive memory system.

FIG. 1 illustrates an example of a virtual drive memory system 10. The virtual drive memory system 10 can be implemented, for example, in a data center associated with an enterprise or a service provider for the storage and access of a large amount of data. The virtual drive memory system 10 includes a plurality of drive systems 12 and an array controller 14. As an example, the drive systems 12 can correspond to memory storage drive systems, such as disk drives, hard drives, solid-state drives, compact disc, digital video disc (DVD) drives, or a variety of other data storage components. Each of the drive systems 12 includes a memory drive 16 and a physical logic (PHY) 18. The memory drive 16 can be associated with the physical memory storage medium that stores the data, and the PHY 18 can be associated with front-end electronics that controls communications (e.g., serial communications) to and from the respective memory drive 16.

In the example of FIG. 1, the array controller 14 includes a memory mapping component 20 that is configured to organize the drive systems 12 into a plurality N of logical volume groups 22, where N is a positive integer greater than one. As an example, the logical volume groups 22 can be arranged as redundant arrays of independent disks (RAID) sets. Each of the logical volume groups 22 can include a plurality of the drive systems 12. In the example of FIG. 1, the logical volume group 22 designated as VOLUME GROUP 1 is demonstrated as having a plurality X of drive systems 12 and the logical volume group 22 designated as VOLUME GROUP N is demonstrated as having a plurality Y of drive systems, where X and Y are each positive integers greater than one. Therefore, each of the logical volume groups 22 can have varying numbers of drive systems 12 relative to each other. In addition, it is to be understood that a given one or more drive systems 12 can belong to more than one logical volume group 22.

As an example, the memory mapping component 20 can be configured at least in part as software, firmware, or a combination thereof. For example, the functions performed by the memory mapping component 20 can be performed as a portion of executable instructions on a non-transitory computer readable medium. As another example, the memory mapping component 20 can include or can access memory that stores logical group data that identifies each of the logical volume groups 22 and the drive systems 12 with which they are associated. The organization of the drive systems 12 by the memory mapping component 20 can be provided in a manner such that each of the logical volume groups 22 can include drive systems 12 that are configured to store related data. As an example, the relationship of the data stored in the drive systems 12 of a given logical volume group 22 can be associated with related processes, customers, geography, time of operation, or a variety of other relationships. Therefore, the drive systems 12 can be organized in the logical volume groups 22 such that the drive systems 12 in a given logical volume group 22 can be active and inactive at similar times (e.g., approximately concurrently).

The memory mapping component 20 can therefore be configured to map data that is to be stored in the drive systems 12 to specific drive systems 12, as well as to access mapped data from specific drive systems 12. The storage and/or access of the data can be performed in such a manner as to be substantially transparent to the respective source and/or destination. Therefore, the distribution of the drive systems 12 in the logical volume groups 22 can be implemented to provide the virtual drive system, such that the array controller 14 can control the distribution of data in the drive systems 12 via the memory mapping component 20.

As an example, the array controller 14 can be configured to communicate with the drive systems 12 in a variety of different communication protocols. For example, array controller 14 can provide commands to and receive status information from the drive systems 12 serially, such as based on Small Computer System Interface (SCSI) commands. Thus, the array controller 14 can provide such commands to the PHY 18 of a given drive system 12 to activate the respective memory drive 16 for storing or accessing data. In addition, the PHY 18 can provide status information to the array controller 14, such as to provide confirmation of data storage and/or access.

As described previously, the drive systems 12 can be organized in each of the logical volume groups 22 to store related data, such that the drive systems 12 in a given logical volume group 22 can be active and inactive at similar times (e.g., approximately concurrently). As a result, a given logical volume group 22 of the drive systems 12 can, at a given time, have one or more of the drive systems 12 being inactive (i.e., in an inactive state). As described herein, a drive system 12 that is "inactive" or in an "inactive state" is defined as being in a state at which the drive system 12 is receiving full power but is not currently writing data to or reading data from the respective memory drive 16. The array controller 14 can thus be configured to monitor activity of the logical volume groups 22 to manage power associated with the virtual drive memory system 10, such that the array controller 14 can conserve power by deactivating an entire logical volume group 22 based on determining inactivity.

In the example of FIG. 1, the array controller 14 includes a power management component 24. As an example, the power management component 24 can be configured at least in part as software, firmware, or a combination thereof. For example, the functions performed by the power management component 24 can be performed as a portion of executable instructions on a non-transitory computer readable medium. The power management component 24 can be configured to monitor status information of each of the drive systems 12 in each of the logical volume groups 22. The power management component 24 can thus determine a status of a given logical volume group 22 as corresponding to an aggregate status of each of the drive systems 12 in the respective logical volume group 22. The power management component 24 can thus dictate a power state of the logical volume group 22 based on the corresponding status of the logical volume group 22.

As an example, the power management component 24 can be configured to deactivate a given logical volume group 22 in response to determining that the logical volume group 22 is inactive. Such a determination can be made based on the array controller 14 identifying which drive systems 12 are inactive (e.g., not currently writing or reading data), and associating inactive drive systems 12 with the respective logical volume groups 22 to which they belong. For example, upon determining that each of the drive systems 12 of a given logical volume group 22 is inactive for a predetermined amount of time based on the array controller 14, the power management component 24 can deactivate all of the drive systems 12 in the respective logical volume group 22. The predetermined amount of time can be programmable and can be tracked by the array controller 14, and can be individual for each of the drive systems 12 or the logical volume groups 22. As an example, power management component 24 can query the activity of the drive systems 12, such as to determine if the respective predetermined time has expired, and can access the memory mapping component 20 to determine if the inactive drive systems 12 are associated with an entire one or more logical volume groups 22. Thus, the power management component 24 can deactivate the respective inactive logical volume groups 22.

As described herein, "deactivating" a drive system 12 can correspond to setting the drive system 12 to a state of lower power consumption, such as a state that provides less power than necessary for full functionality of the respective drive systems 12. For example, the power management component 24 can set the drive systems 12 to one of a plurality of lower power states, such as based on SCSI power commands. One or more of the lower power states can include a sleep mode or an idle mode. As another example, the power management component 24 can remove all power from the drive systems 12. In addition, the power management component 24 can control the power setting of the memory drives 16 separate from the power setting of the PHY 18 in a given drive system 12. For example, upon determining that all of the drive systems 12 of a given logical volume group 22 are inactive, the power management component 24 can deactivate just the memory drive 16, such as to retain communication with the respective PHY 18. As another example, the power management component 24 can first deactivate the memory drive 16, and then subsequently deactivate the respective PHY 18.

The power management component 24 can thus substantially conserve power in the virtual drive memory system 10 by deactivating inactive logical volume groups 22. In addition, in response to the array controller 14 determining that one or more of the drive systems 12 in a given deactivated logical volume group 22 is to be switched to an active state, the power management component 24 can be configured to reactivate the respective logical volume group 22. For example, the memory mapping component 20 can determine that data is to be written to or accessed from a given one of the drive systems 12 in a given deactivated logical volume group (i.e., including deactivated drive systems). In response, the power management component 24 can reactivate the deactivated logic group 22 by reactivating each of the drive systems 12 in the deactivated logic group 22. For example, the power management component 24 can set the power state of the deactivated drive systems 12 to an active power state. As described herein, a drive system 12 that is to be switched to an "active state" is defined as switching the drive system 12 to a state at which the drive system 12 requires full power for normal operation of the drive system 12 to allow writing data to and/or reading data from the memory drive 16. As an example, the power management component 24 can first reactivate the PHY 18, and then subsequently reactivate the respective memory drive 16. Accordingly, the drive systems 12 of the respective logical volume group 22 can resume normal operation.

Figure 2:
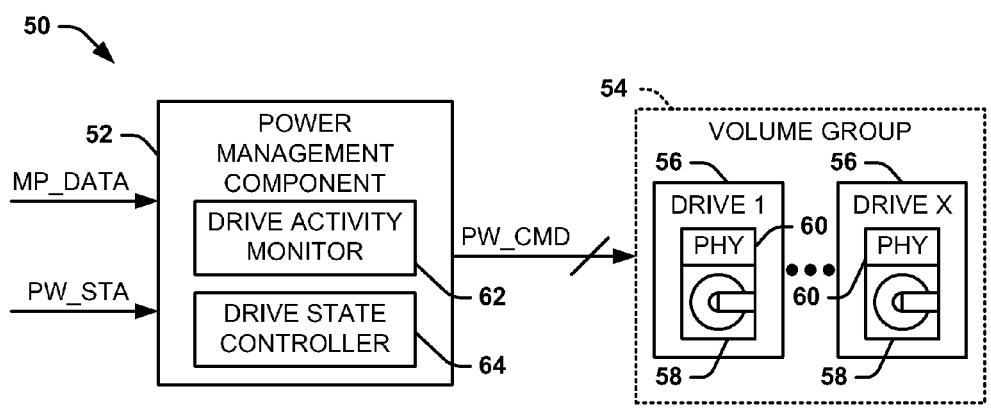
FIG. 2 illustrates an example of a power management system in a virtual drive memory system.

FIG. 2 illustrates an example of a power management system 50 in a virtual drive memory system. The power management system 50 includes a power management component 52 and a logical volume group 54 that includes a plurality X of drive systems 56, where X is a positive integer greater than one. Each of the drive systems 56 includes a memory drive 58 and a physical logic (PHY) 60. The power management component 52 and a logical volume group 54 can respectively correspond to the power management component 24 and a logical volume group 22 of the virtual drive memory system 10 in the example of FIG. 1. Therefore, reference is to be made to the example of FIG. 1 in the following description of the example of FIG. 2.

The power management system 50 includes a drive activity monitor 62 and a drive state controller 64. As an example, at least a portion of each of the drive activity monitor 62 and the drive state controller 64 can be configured as software, firmware, or a combination thereof. For example, the functions performed by the drive activity monitor 62 and/or the drive state controller 64 can be performed as a portion of executable instructions on a non-transitory computer readable medium. The drive activity monitor 62 is configured to monitor the activity of each of the drive systems 56 in the logical volume group 54 based on one or more status signals PW_STA to the power management component 52, such as from the associated memory mapping component (e.g., the memory mapping component 20). For example, the drive activity monitor 62 can query the activity of the drive systems 56, such as determined by the associated array controller, such that the status signal(s) PW_STA can be provided in response to the query. As an example, the status signal(s) PW_STA can indicate if respective predetermined inactivity times have expired. The status signal(s) PW_STA can also indicate that the drive systems 56 are associated with the logical volume group 54, such as based on memory mapping information from an associated memory mapping component, for a determination that the drive systems 56 associated with the specific logical volume group 54 are inactive.

Upon determining that all of the drive systems 56 in the logical volume group 54 are in a substantially inactive state, such as not currently reading or writing data, the drive state controller 64 can deactivate all of the drive systems 56 based on providing one or more command signals PW_CMD. As an example, the drive activity monitor 62 can implement a timer, such that the drive state controller 64 can deactivate all of the drive systems 56 in the logical volume group 54 in response to the drive systems 56 being substantially inactive for a programmable amount of time. As an example, the deactivation of the drive systems 56 can correspond to setting the status of the drive systems 56 to a low power consumption state, such as a sleep mode or a "powered-off" state. The deactivation of the drive systems 56 can correspond to deactivation of one or both of the memory drive 58 and the PHY 60 of the respective drive systems 56. For example, the drive state controller 64 can first deactivate the memory drive 58 then the PHY 60 of each of the drive systems 56 via the command signals PW_CMD. Similar to as described previously regarding the status signals, the command signals PW_CMD can be implemented as command signals over a bus, such as a serial attached SCSI (SAS) lane.

In addition, the drive state controller 64 can be configured to reactivate the logical volume group 54 in response to a determination that one or more of the drive systems 56 is to be switched to an active state. In the example of FIG. 2, the power management component 52 receives a signal MP_DATA that can correspond to data that is to be written to the one or more of the drive systems 56 or a request for data from the one or more of the drive systems 56. As an example, the signal MP_DATA can be provided from a memory mapping component, such as the memory mapping component 20 in the example of FIG. 1. As another example, the drive activity monitor 62 can be configured to monitor a data bus or a buffer associated with data to be written to or read from the drive systems 56 associated with the logical volume group 54. As yet another example, the information provided by the signal MP_DATA can be included in the information provided by the status signal(s) PW_STA, such that the information in the signal MP_DATA and in the status signal(s) PW_STA can be included together.

In response to determining that the one or more drive systems 56 in the logical volume group 54 are to be switched to an active state to store or provide data based on the signal MP_DATA, the drive state controller 64 can reactivate all of the drive systems 56 in the logical volume group 54. For example, the drive state controller 64 can set the drive systems 56 to a power state sufficient for normal operation via the command signals PW_CMD. For example, the drive state controller 64 can reactivate the memory drive 58 of each of the drive systems 64, or can first reactivate the PHY 60 then the memory drive 58 of each of the drive systems 56 via the command signals PW_CMD. Accordingly, the drive systems 56 can resume normal operation.

It is to be understood that the logical volume group 54 in the example of FIG. 2 could be one of a plurality of logical volume groups, such that the power management component 52 can manage the power settings of each of the logical volume groups individually. Therefore, as described herein, the power management component 52 can be configured to manage power in the associated virtual drive memory system (e.g., the virtual drive memory system 10) based on providing for the power needs of the aggregate drive systems 56 in each logical volume group. As a result, the associated virtual drive memory system can achieve significant power conservation in a simplistic manner, such as by treating each logical volume group as a single power entity based on the aggregate power needs of the individual drive systems 56 in each of the logical volume groups.

Figure 3:
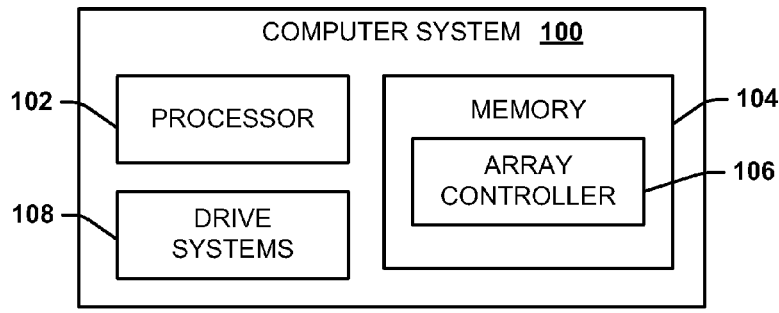
FIG. 3 illustrates an example of a computer system.

FIG. 3 illustrates an example of a computer system 100. The computer system 100 can be implemented, for example, as an enterprise server system, as a service provider computer system, as a personal computer or computer system, as part of a private network system, or as any of a variety of other types of computer systems. The computer system 100 includes a processor 102 and a memory system 104. The processor(s) 102 can be configured as a central processors for operation of the computer system 100. The memory 104 can be configured as a non-transitory machine readable medium, such as can include random access memory (RAM) and/or read-only memory (ROM), configured to store data and instructions associated with operation of the computer system 100.

The computer system 100 also includes an array controller 106 and a plurality of drive systems 108. The array controller 106 can be implemented as non-transitory machine readable instructions stored in the memory 104 that can be executed by the processor 102. In other examples, the array controller 106 can be implemented as a set of instructions stored in another dedicated memory system (not shown), which can be executed by the processor 102 or another dedicated processor. The array controller 106 can be configured to operate substantially similar to the array system 14 in the example of FIG. 1, and the drive systems 108 can be configured substantially similar to the drive systems 12 in the example of FIG. 1. Therefore, the array controller 106 can be configured to organize the drive systems 108 into a plurality of logical volume groups, and can provide power management capability as described herein. Data describing the logical volume groups can also be stored in the memory 104. Reference can be made the description of FIGS. 1 and 2 for additional functions of the array controller 106.

Figure 4:
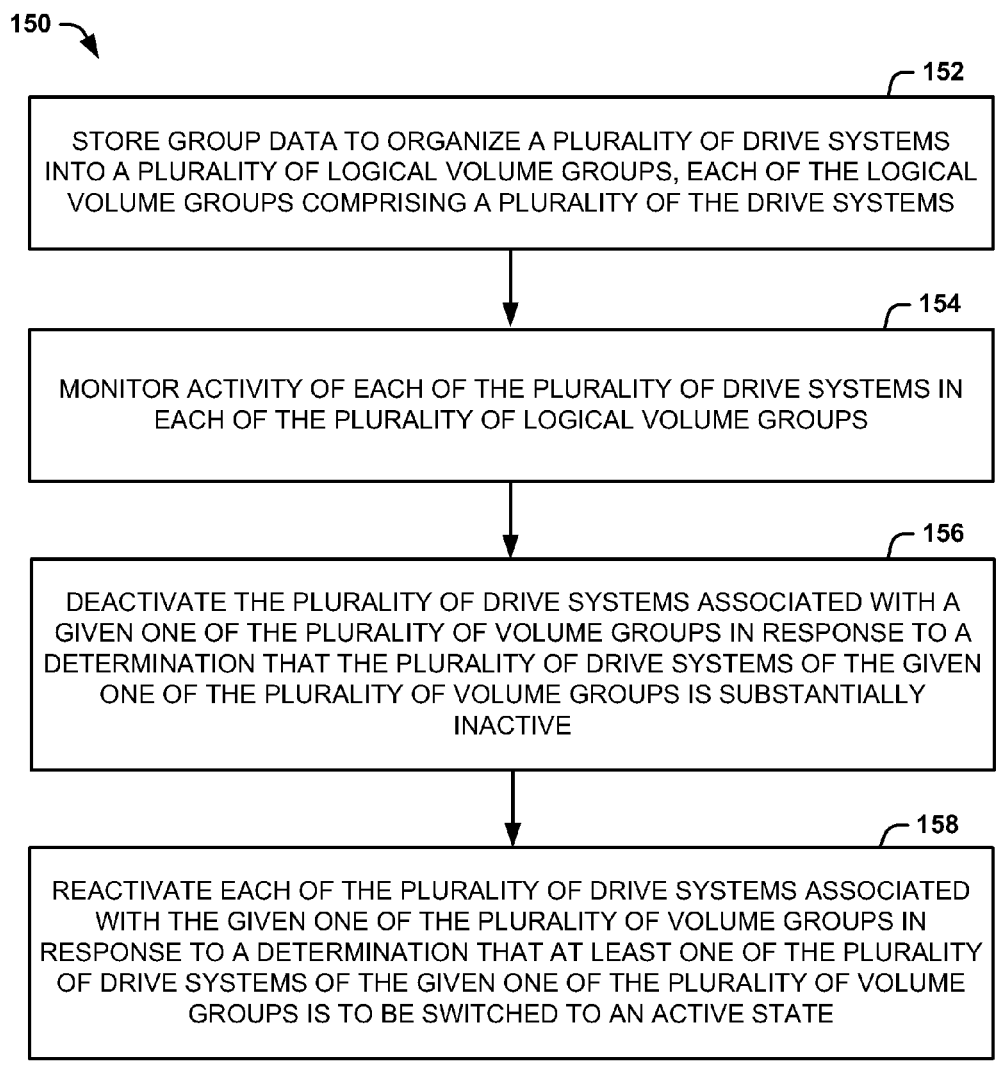
FIG. 4 illustrates an example of a method for conserving power in a virtual drive memory system.

In view of the foregoing structural and functional features described above, an example method will be better appreciated with reference to FIG. 4. While, for purposes of simplicity of explanation, the method of FIG. 4 is shown and described as executing serially, it is to be understood and appreciated that the method is not limited by the illustrated order, as parts of the method could occur in different orders and/or concurrently from that shown and described herein.

FIG. 4 illustrates an example of a method 150 for conserving power (e.g., the virtual drive memory system 10). At 152, group data to organize a plurality of drive systems (e.g., the drive systems 12) into a plurality of logical volume groups (e.g., the logical volume groups 22) is stored, each of the logical volume groups comprising a plurality of the drive systems. At 154, activity of the plurality of drive systems in each of the plurality of logical volume groups is monitored. At 156, the plurality of drive systems of a given one of the plurality of logical volume groups are deactivated in response to a determination that the plurality of drive systems of the given one of the plurality of logical volume groups is substantially inactive. At 158, each of the plurality of drive systems associated with the given one of the plurality of logical volume groups is reactivated in response to a determination that at least one of the plurality of drive systems associated with the given one of the plurality of logical volume groups is to be switched to an active state.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. A volume group power control system comprising:
an array controller to organize a plurality of drive systems into a plurality of logical volume groups and to store group data identifying each of the plurality of logical volume groups, each of the logical volume groups comprising a plurality of the drive systems, the array controller comprising a power management component to monitor activity of each of the plurality of drive systems in each of the plurality of logical volume groups to determine an aggregate status for each of the plurality of logical volume groups by aggregating statuses of each of the drive systems in a respective logical volume group and to deactivate the plurality of drive systems associated with a given one of the plurality of logical volume groups to a lower power state in response to the power management component determining based on the aggregate status for the given one of the plurality of logical volume groups that the plurality of drive systems associated with the given one of the plurality of logical volume groups is substantially inactive for a predetermined amount of time.

2. The system of claim 1, wherein the array controller is to communicate with the plurality of drive systems via Small Computer System Interface (SCSI) commands.

3. The system of claim 1, wherein each of the plurality of drive systems comprises a memory drive to store data and a physical logic (PHY) to control communications associated with the memory drive.

4. The system of claim 3, wherein the power management component is to deactivate the PHY subsequent to the deactivation of the memory drive in response to the determination that the plurality of drive systems associated with the given one of the plurality of logical volume groups is substantially inactive.

5. The system of claim 1, wherein the power management component is further to reactivate each of the plurality of drive systems associated with the given one of the plurality of logical volume groups in response to the power management component determining that at least one of the plurality of drive systems associated with the given one of the plurality of logical volume groups is to be switched to an active state.

6. The system of claim 1, wherein the array controller further comprises memory mapping component to organize the plurality of logical volume groups in a manner such that the plurality of drive systems in each of the plurality of logical volume groups are to store related data.

7. The system of claim 1, wherein the predetermined amount of time is a programmable amount of time.

8. A virtual drive memory system comprising the system of claim 1 and further comprising the plurality of drive systems.

9. The system of claim 1, wherein each of the plurality of drive systems associated with the given one of the plurality of logical volume groups has an individual predetermined amount time, the array controller to deactivate each the plurality of drive systems associated with the given one of the plurality of logical volume groups to the lower power state in response to the power management component determining each respective drive system associated with the given one of the plurality of logical volume groups has been substantially inactive for its individual predetermined amount of time.

10. A non-transitory computer readable medium for implementing a method for conserving power, the medium including instructions, which when executed, cause an array controller to:
store group data to organize a plurality of drive systems into a plurality of logical volume groups, each of the logical volume groups comprising a plurality of the drive systems;
monitor activity of each of the plurality of drive systems in each of the plurality of logical volume groups to determine an aggregate status for each of the plurality of logical volume groups by aggregating statuses of each of the drive systems in a respective logical volume group;
deactivate the plurality of drive systems of a given one of the plurality of logical volume groups to a lower power state in response to a determination based on the aggregate status for the given one of the plurality of logical volume groups that the plurality of drive systems of the given one of the plurality of logical volume groups is substantially inactive for a predetermined amount of time; and
reactivate each of the plurality of drive systems associated with the given one of the plurality of logical volume groups in response to a determination that at least one of the plurality of drive systems associated with the given one of the plurality of logical volume groups is to be switched to an active state.

11. The medium of claim 10, wherein to deactivate the plurality of drive systems comprises to:
deactivate a memory drive of each of the plurality of drive systems in the given one of the plurality of logical volume groups, the memory drive being to store data; and
deactivate a physical logic (PHY) of each of the plurality of drive systems in the given one of the plurality of logical volume groups subsequent to deactivating the memory drive, the PHY being to control communications associated with the memory drive.

12. The medium of claim 10, wherein the predetermined amount of time is a programmable amount of time.

13. The medium of claim 10, wherein to store the group data further comprises to organize the plurality of drive systems into the plurality of logical volume groups such that the plurality of drive systems in each of the plurality of logical volume groups are to store related data.

14. The medium of claim 10, wherein each of the plurality of drive systems associated with the given one of the plurality of logical volume groups has an individual predetermined amount time, the instructions further to cause the array controller to deactivate each the plurality of drive systems associated with the given one of the plurality of logical volume groups to the lower power state in response to the power management component determining each respective drive system associated with the given one of the plurality of logical volume groups has been substantially inactive for its individual predetermined amount of time.

15. A virtual drive memory system comprising:
a plurality of drive systems that are each configured as a memory to store data; and
an array controller to organize the plurality of drive systems into a plurality of logical volume groups and to store group data identifying each of the plurality of logical volume groups, each of the logical volume groups comprising a plurality of the drive systems organized such that the plurality of drive systems in each of the plurality of logical volume groups are to store related data, the array controller comprising a power management component to monitor activity of each of the plurality of drive systems in each of the plurality of logical volume groups to determine an aggregate status for each of the plurality of logical volume groups by aggregating statuses of each of the drive systems in a respective logical volume group and to deactivate the plurality of drive systems associated with a given one of the plurality of logical volume groups to a lower power state in response to the power management component determining based on the aggregate status for the given one of the plurality of logical volume groups that the plurality of drive systems associated with the given one of the plurality of logical volume groups is substantially inactive for a programmable amount of time.

16. The virtual system of claim 15, wherein each of the plurality of drive systems comprises a memory drive to store data and a physical logic (PHY) to control communications associated with the memory drive, and in response to the determination that the plurality of drive systems associated with the given one of the plurality of logical volume groups is substantially inactive, the power management component being further to deactivate the memory drive and then to subsequently deactivate the PHY.

17. The virtual system of claim 15, wherein the power management component is to reactivate each of the plurality of drive systems associated with the given one of the plurality of logical volume groups in response to the power management component determining that at least one of the plurality of drive systems associated with the given one of the given one of the plurality of logical volume groups is to be switched to an active state.

* * * * *